United States Patent
Osakabe et al.

(10) Patent No.: US 10,227,441 B2
(45) Date of Patent: Mar. 12, 2019

(54) SILYL-TERMINATED RESIN COMPOSITION AND METHOD FOR PRODUCING SAME

(71) Applicant: SHIRAISHI KOGYO KAISHA, LTD., Osaka-shi, Osaka (JP)

(72) Inventors: Kanehiro Osakabe, Amagasaki (JP); Yoshisada Kayano, Amagasaki (JP)

(73) Assignee: SHIRAISHI KOGYO KAISHA, LTD., Osaka (JP)

( * ) Notice: Subject to any disclaimer, the term of this patent is extended or adjusted under 35 U.S.C. 154(b) by 0 days.

(21) Appl. No.: 15/537,946

(22) PCT Filed: Dec. 24, 2014

(86) PCT No.: PCT/JP2014/084079
§ 371 (c)(1),
(2) Date: Jun. 20, 2017

(87) PCT Pub. No.: WO2016/103347
PCT Pub. Date: Jun. 30, 2016

(65) Prior Publication Data
US 2017/0342191 A1 Nov. 30, 2017

(51) Int. Cl.
| | | |
|---|---|---|
| *C09C 3/08* | (2006.01) | |
| *C08G 18/28* | (2006.01) | |
| *C08K 3/26* | (2006.01) | |
| *C09C 1/02* | (2006.01) | |
| *C08K 9/04* | (2006.01) | |
| *C08L 101/02* | (2006.01) | |
| *C01F 11/18* | (2006.01) | |
| *C08G 18/46* | (2006.01) | |
| *C08G 18/58* | (2006.01) | |
| *C09K 3/10* | (2006.01) | |

(52) U.S. Cl.
CPC ........... *C08G 18/289* (2013.01); *C01F 11/18* (2013.01); *C08G 18/4692* (2013.01); *C08G 18/588* (2013.01); *C08K 3/26* (2013.01); *C08K 9/04* (2013.01); *C08L 101/02* (2013.01); *C09C 1/02* (2013.01); *C09C 3/08* (2013.01); *C09K 3/1018* (2013.01); *C09K 3/1021* (2013.01); *C08K 2003/265* (2013.01); *C08K 2201/006* (2013.01)

(58) Field of Classification Search
None
See application file for complete search history.

(56) References Cited

U.S. PATENT DOCUMENTS

| | | | | |
|---|---|---|---|---|
| 6,686,044 B2 * | 2/2004 | Nakai | .............. | C08K 9/04 427/212 |
| 7,863,367 B2 * | 1/2011 | Takahashi | .............. | C09C 1/021 423/430 |
| 8,329,802 B2 * | 12/2012 | Hasegawa | ............. | C01F 11/185 524/425 |
| 8,741,995 B2 * | 6/2014 | Fujiwara | .............. | C01F 11/185 106/465 |
| 2012/0309877 A1 | 12/2012 | Fujiwara et al. | | |
| 2015/0112009 A1 * | 4/2015 | Fukumoto | ................ | C09C 3/08 524/300 |

FOREIGN PATENT DOCUMENTS

| | | |
|---|---|---|
| JP | 2007-169485 A | 7/2007 |
| JP | 2013-47300 A | 3/2013 |
| JP | 2013-216863 A | 10/2013 |
| JP | 2014-156525 A | 8/2014 |

OTHER PUBLICATIONS

Archived Human Translation of JP 2007-169485, 56 pages, translation generated Jul. 2015. (Year: 2015).*
Notification of Transmittal of Translation of the International Preliminary Report on Patentability (Form PCT/IB/338) issued in counterpart International Application No. PCT/JP2014/084079 dated Jul. 6, 2017 with Forms PCT/IB/373 and PCT/ISA/237 (7 pages).
International Search Report dated Feb. 3, 2015, issued in counterpart application No. PCT/JP2014/084079. (2 pages).
Extended (supplementary) European Search Report dated Jul. 10, 2018, issued in counterpart European Application No. 14908955.9. (5 pages).

* cited by examiner

*Primary Examiner* — Robert S Loewe
(74) *Attorney, Agent, or Firm* — Westerman, Hattori, Daniels & Adrian, LLP

(57) ABSTRACT

There are provided a silyl-terminated resin composition and a method for producing the same, the silyl-terminated resin composition being superior in storage stability before curing and providing a cured product which has a low initial modulus and can maintain the low modulus even after a heat-accelerated test. The silyl-terminated resin composition comprises a surface-treated calcium carbonate and a silyl-terminated resin, wherein the surface-treated calcium carbonate is obtained by surface-treating calcium carbonate having a BET specific surface area in the range of 1 $m^2/g$ to 60 $m^2/g$ with a fatty acid, and has an alkali metal content in the range of 500 µg/g to 2000 µg/g and the free fatty acid as determined by ethanol extraction in the range of 1.8 to 2.5% by mass.

7 Claims, No Drawings

SILYL-TERMINATED RESIN COMPOSITION AND METHOD FOR PRODUCING SAME

TECHNICAL FIELD

The present invention relates to a silyl-terminated resin composition and a method for producing the same.

BACKGROUND ART

In a sealant using a silicone-modified resin which is a silyl-terminated polyether resin, it is requested that a cured product have a low modulus even when calcium carbonate is incorporated. When a cured product has a low modulus, the cured product can follow up a building or the like even when it expands or contracts. Thus, a sealant superior in followability can be obtained. Patent Literature 1 proposes a silicone-modified resin composition in which a surface-treated calcium carbonate is incorporated, the calcium carbonate being surface-treated with at least one of a fatty acid, a resin acid, and a derivative thereof and having an alkali metal content of 500 µg/g to 2000 µg/g.

CITATION LIST

Patent Literature

Patent Literature 1: Japanese Patent Laid-Open No. 2013-47300

SUMMARY OF INVENTION

Technical Problem

According to the technique of Patent Literature 1, there is obtained a silicone-modified resin composition which provides a cured product having a low modulus. However, recently, a sealant which can maintain a low modulus for a long period of time has been required.

An object of the present invention is to provide a silyl-terminated resin composition and a method for producing the same, the silyl-terminated resin composition being superior in storage stability before curing and providing a cured product which has a low initial modulus and can maintain the low modulus even after a heat-accelerated test.

Solution to Problem

The silyl-terminated resin composition of the present invention comprises a surface-treated calcium carbonate and a silyl-terminated resin, wherein the surface-treated calcium carbonate is obtained by surface-treating calcium carbonate having a BET specific surface area in the range of 1 $m^2/g$ to 60 $m^2/g$ with a fatty acid, and has an alkali metal content in the range of 500 µg/g to 2000 µg/g and the free fatty acid as determined by ethanol extraction in the range of 1.8 to 2.5% by mass.

Examples of the silyl-terminated resin include a silyl-terminated polyether resin and a silyl-terminated polyurethane resin as a main component.

The content of the surface-treated calcium carbonate contained in the silyl-terminated resin composition is preferably in the range of 50 parts by mass to 200 parts by mass based on 100 parts by mass of the silyl-terminated resin.

The alkali metal is preferably at least one of sodium and potassium.

The production method of the present invention is a method for producing the silyl-terminated resin composition of the present invention, comprising the steps of: surface-treating calcium carbonate with a fatty acid so that the free fatty acid will be in the range of 1.8 to 2.5% by mass; adding an alkali metal compound to the fatty acid-treated calcium carbonate to produce a surface-treated calcium carbonate; and blending the surface-treated calcium carbonate with a silyl-terminated resin.

Advantageous Effects of Invention

The present invention can provide a silyl-terminated resin composition which is superior in storage stability before curing and provides a cured product which has a low initial modulus and can maintain the low modulus even after a heat-accelerated test.

DESCRIPTION OF EMBODIMENTS

Hereinafter, preferred embodiments will be described. However, the following embodiments are merely illustrative, and the present invention is not limited to the following embodiments.

(Calcium Carbonate)

For example, conventionally known calcium carbonate can be used as calcium carbonate to be surface-treated. Specific examples of the calcium carbonate include synthetic calcium carbonate and natural calcium carbonate (calcium carbonate heavy). The calcium carbonate is preferably synthetic calcium carbonate.

Synthetic calcium carbonate is not particularly limited. Examples of synthetic calcium carbonate include precipitated (colloidal) calcium carbonate and precipitated calcium carbonate light. Synthetic calcium carbonate can be produced, for example, by allowing calcium hydroxide to react with carbon dioxide gas. The calcium hydroxide can be produced, for example, by allowing calcium oxide to react with water. The calcium oxide can be produced, for example, by subjecting limestone ore to mixed firing with coke or the like. In this case, since carbon dioxide gas is generated during firing, calcium carbonate can be produced by allowing this carbon dioxide gas to react with calcium hydroxide.

Natural calcium carbonate is obtained by grinding naturally occurring calcium carbonate ore by a known method. Examples of the method for grinding calcium carbonate ore include methods for grinding the ore using a roller mill, a high-speed rotary mill (impact shearing mill), a container-driving medium mill (ball mill), a medium stirring mill, a planetary ball mill, and a jet mill.

The BET specific surface area of calcium carbonate is preferably in the range of 1 $m^2/g$ to 60 $m^2/g$, more preferably in the range of 3 $m^2/g$ to 30 $m^2/g$, and further preferably in the range of 7 $m^2/g$ to 30 $m^2/g$. If the BET specific surface area of calcium carbonate is too low, it cannot have high thixotropy, thereby impairing the function as a surface-treated calcium carbonate. If the BET specific surface area of calcium carbonate is too high, it will generally have high cohesive strength, and even if such calcium carbonate is surface-treated, the surface-treated calcium carbonate will have poor dispersibility and not make a sealing material viscous when incorporated therein.

(Fatty Acid)

Examples of the fatty acid include saturated or unsaturated fatty acids having 6 to 31 carbon atoms.

Specific examples of the saturated fatty acid include caproic acid, caprylic acid, pelargonic acid, capric acid, undecanoic acid, lauric acid, myristic acid, palmitic acid, stearic acid, arachic acid, behenic acid, lignoceric acid, cerotic acid, montanic acid, and melissic acid. Among them, lauric acid, myristic acid, palmitic acid, stearic acid, arachic acid, and the like are preferably used.

Further, specific examples of the unsaturated fatty acid include obtusilic acid, caproleic acid, undecylenic acid, linderic acid, tsuzuic acid, physeteric acid, myristoleic acid, palmitoleic acid, petroselinic acid, oleic acid, elaidic acid, asclepinic acid, vaccenic acid, gadoleic acid, gondoic acid, cetoleic acid, erucic acid, brassidic acid, selacholeic acid, ximenic acid, lumequeic acid, sorbic acid, and linoleic acid.

In the present invention, the form of a fatty acid when calcium carbonate is surface-treated with the fatty acid is not particularly limited, and calcium carbonate may be surface-treated with a fatty acid in the form of a metal salt, in the form of an acid, in the form of an ester, or the like. These forms may optionally be used in combination for surface treatment.

Examples of the metal salt of a fatty acid include alkali metal salts, such as a sodium salt and a potassium salt, of the above fatty acid and alkaline earth metal salts, such as a magnesium salt and a calcium salt, thereof. Among them, alkali metal salts, such as a sodium salt and a potassium salt, of the above fatty acid are preferred.

Examples of the fatty acid ester include stearyl stearate, lauryl stearate, stearyl palmitate, and lauryl palmitate.

Examples of more preferred forms of the fatty acid when calcium carbonate is surface-treated include a sodium salt of a saturated fatty acid having 9 to 21 carbon atoms and a potassium salt thereof. Among them, sodium salts of lauric acid, myristic acid, palmitic acid, stearic acid, and oleic acid are particularly preferred.

(Surface Treatment Method)

Examples of a method for surface-treating calcium carbonate include a wet processing method and a dry processing method.

In the wet processing method is included, for example, a method in which a solution containing a fatty acid is added to a slurry containing calcium carbonate and water, and the mixture is then dehydrated and dried. Examples of the solution containing a fatty acid include solutions containing the fatty acid in the form of a metal salt such as an alkali metal salt, in the form of an acid, and in the form of an ester. Among them, a solution containing a fatty acid in the form of an alkali metal salt as a main component of the fatty acid is preferably used.

In the dry processing method is included, for example, a method of adding a surface treatment agent to calcium carbonate while stirring the calcium carbonate. The surface treatment agent may be added in the form of a solution or may be added while heating the calcium carbonate to a temperature equal to or higher than the melting point of the surface treatment agent. In this case, a fatty acid may be in the form of an acid, or may be in the form of an ester, or may be in the form of a metal salt. Further, the calcium carbonate may be calcium carbonate surface-treated by wet processing or the like.

(Free Fatty Acid)

In the surface-treated calcium carbonate of the present invention, the free fatty acid as determined by ethanol extraction is in the range of 1.8 to 2.5% by mass. The "free fatty acid" as used in the present invention refers to the total amount of materials which are derived from a surface treatment agent and can be extracted with ethanol. That is, the free fatty acid refers to the total amount of a fatty acid, a metal salt of a fatty acid, an ester of a fatty acid, and the like, which are extracted with ethanol. If the free fatty acid is less than 1.8% by mass, a low modulus cannot be maintained in a heat-accelerated test. Further, if the free fatty acid is more than 2.5% by mass, storage stability before curing will be reduced. In the present invention, the free fatty acid is preferably in the range of 1.9 to 2.4% by mass, more preferably in the range of 1.9 to 2.3% by mass.

When calcium carbonate is surface-treated with an alkali metal salt of a fatty acid, the value of free fatty acid can be adjusted by adding a fatty acid in the form of an acid or in the form of an ester to the alkali metal salt of the fatty acid. Further, the value of free fatty acid can also be adjusted by adjusting the amount of a surface treatment agent based on the BET specific surface area of calcium carbonate. Further, when calcium carbonate is surface-treated using a wet processing method, the value of free fatty acid can also be adjusted by adjusting the temperature of a calcium carbonate slurry. In this case, when the temperature of the calcium carbonate slurry is increased, the value of free fatty acid tends to be low, and when the temperature of the calcium carbonate slurry is decreased, the value of free fatty acid tends to be high.

The free fatty acid is measured by extracting a surface-treated calcium carbonate with ethanol and determined by the following formula.

$$\text{Amount of extracted fatty acid (\% by weight)} = [(\text{weight of surface-treated calcium carbonate before extraction} - \text{weight of surface-treated calcium carbonate after extraction})/(\text{weight of surface-treated calcium carbonate before extraction})] \times 100$$

(Alkali Metal Content)

The alkali metal content of the surface-treated calcium carbonate of the present invention is in the range of 500 µg/g to 2000 µg/g. The alkali metal content of the surface-treated calcium carbonate is preferably in the range of 700 µg/g to 1900 µg/g, more preferably in the range of 800 µg/g to 1800 µg/g, and further preferably in the range of 1000 µg/g to 1800 µg/g. If the alkali metal content is too low, a low modulus will hardly be obtained in a cured product. If the alkali metal content is too high, adhesion after a cured product is immersed in water will be poor, and the economy also will be disadvantageous, which is not desirable.

The alkali metal is preferably at least one of sodium and potassium.

The alkali metal content can be adjusted, for example, by adding an alkali metal compound in the step of producing a surface-treated calcium carbonate. For example, the alkali metal content can be adjusted by adding an aqueous solution of an alkali metal compound to an aqueous slurry of calcium carbonate which is surface-treated with a fatty acid. The alkali metal content can be adjusted by adjusting the amount of the alkali metal compound to be added. The surface-treated calcium carbonate can be obtained by adding an aqueous solution of an alkali metal compound and then performing dehydration and drying in the usual manner. Further, the aqueous solution of an alkali metal compound may be added after dehydrating the aqueous slurry of calcium carbonate which is surface-treated with a fatty acid. The surface-treated calcium carbonate can be obtained by adding an aqueous solution of an alkali metal compound and then performing drying in the usual manner.

Examples of the alkali metal compound include a hydroxide of sodium or potassium and a carbonate thereof. As the alkali metal compound, sodium hydroxide and sodium carbonate are preferred among them. The alkali metal compound may be used singly or in combination.

Further, when calcium carbonate is surface-treated with an alkali metal salt of a fatty acid, the alkali metal in the surface treatment agent is also included in the above alkali metal content. Therefore, the alkali metal content of the surface-treated calcium carbonate is suitably adjusted so that the alkali metal content will be in the above range including the alkali metal in the surface treatment agent.

The alkali metal content is measured with an atomic absorption spectrophotometer. An example thereof will be described below.

A sample in an amount of 0.10 g is weighed, put into an electric furnace, and allowed to stand at 300° C. for 2 hours. Then, the resulting sample is taken out and charged with distilled water and hydrochloric acid to be completely dissolved. The resulting solution is put into a 50 ml measuring flask and diluted to 50 ml with distilled water to prepare a measurement sample. A reference solution having a known concentration is prepared, and an alkali metal such as sodium and potassium is measured with an atomic absorption spectrophotometer.

(Silyl-Modified Resin Composition)

The content of a surface-treated calcium carbonate contained in a silyl-modified resin composition is preferably 50 parts by weight to 200 parts by weight, more preferably 80 parts by weight to 150 parts by weight, based on 100 parts by weight of the silyl-modified resin. When the content of the surface-treated calcium carbonate contained in the silicone-modified resin composition is within the above range, suitable viscosity and thixotropy will be secured before curing, and workability will be improved. Therefore, the above content is preferred. Further, since the balance of a modulus, elongation, and strength will be improved after curing, the above content is preferred.

Examples of the silyl-terminated resin include a resin containing a silyl-terminated polyether resin and a silyl-terminated polyurethane resin as a main component. The silyl-terminated polyether resin is known as a silicone-modified resin. Hereinafter, a silicone-modified resin and a silicone-modified resin composition will be described.

(Silicone-Modified Resin and Silicone-Modified Resin Composition)

The silicone-modified resin is a resin containing, as a main component, a silyl-terminated polyether obtained by introducing reactive silyl groups into terminals. For example, when the silicone-modified resin composition is used as a sealant, the silicone-modified resin preferably forms siloxane bonds by moisture curing. Examples of the silicone-modified resin include polymers which have a linear or branched polyoxyalkylene polymer as a main chain and are formed by introducing silyl groups into terminal hydroxyl groups of the main chain. The silicone-modified resin may be a known resin. Commercially available products of the silicone-modified resin are easily available. Examples of the commercially available products of the silicone-modified resin include MS polymer S810, MS polymer S202, MS polymer S203, and MS polymer S303, all manufactured by Kaneka Corporation, and EXCESTAR manufactured by Asahi Glass Co., Ltd.

The silicone-modified resin composition may contain a plasticizer, a filler, an adhesion-imparting agent, a dehydrating agent, a catalyst, and the like in addition to the silicone-modified resin.

Examples of the plasticizer include dimethyl phthalate (DMP), diethyl phthalate (DEP), di-n-butyl phthalate (DBP), diheptyl phthalate (DHP), dioctyl phthalate (DOP), diisononyl phthalate (DINP), diisodecyl phthalate (DIDP), ditridecyl phthalate (DTDP), butylbenzyl phthalate (BBP), dicyclohexyl phthalate (DCHP), tetrahydrophthalate, dioctyl adipate (DOA), diisononyl adipate (DINA), diisodecyl adipate (DIDA), di-n-alkyl adipate, dibutyldiglycol adipate (BXA), bis(2-ethylhexyl) azelate (DOZ), dibutyl sebacate (DBS), dioctyl sebacate (DOS), dibutyl maleate (DBM), di-2-ethylhexyl maleate (DOM), dibutyl fumarate (DBF), tricresyl phosphate (TCP), triethyl phosphate (TEP), tributyl phosphate (TBP), tris-(2-ethylhexyl) phosphate (TOP), tri (chloroethyl)phosphate (TCEP), tris(dichloropropyl)phosphate (CRP), tributoxyethyl phosphate (TBXP), tris($\beta$-chloropropyl)phosphate (TMCPP), triphenyl phosphate (TPP), octyl diphenyl phosphate (CDP), acetyl triethyl citrate, acetyl tributyl citrate, a trimellitic acid-based plasticizer, a polyester plasticizer, chlorinated paraffin, a stearic acid-based plasticizer, and dimethylpolysiloxane.

Examples of the filler (including a thickener) include an inorganic filler and an organic filler. Examples of the inorganic filler include calcium carbonate (such as precipitated calcium carbonate light and calcium carbonate heavy), calcium-magnesium carbonate, basic magnesium carbonate, quartz powder, silica powder, finely-divided silicic acid (a dry-process product, a wet-process product, and a gel-process product), finely-divided calcium silicate, finely-divided aluminum silicate, kaolin clay, pyrophyllite clay, talc, sericite, mica, bentonite, nepheline-syenite, aluminum hydroxide, magnesium hydroxide, barium sulfate, carbon black (furnace, thermal, and acetylene), and graphite; and examples of acicular and fibrous inorganic fillers include sepiolite, wollastonite, xonotlite, potassium titanate, carbon fibers, mineral fibers, glass fibers, Shirasu balloons, fly ash balloons, glass balloons, silica beads, alumina beads, and glass beads. Further, examples of the organic filler include a powdered or bead-like organic filler such as wood powder, walnut powder, cork powder, wheat flour, starch, ebonite powder, rubber powder, lignin, phenol resin, high-styrene resin, polyethylene resin, silicone resin, and urea resin; and a fibrous organic filler such as cellulose powder, pulp powder, synthetic fiber powder, amide wax, fatty amide, and castor oil wax.

Examples of the adhesion-imparting agent include hydrolyzable organic silicone compounds. Specific examples of the hydrolyzable organic silicone compounds include silane compounds such as vinyltrimethoxysilane, methyltrimethoxysilane, methyltriethoxysilane, ethyltriethoxysilane, phenyltriethoxysilane, methyltriacetoxysilane, tetramethyl orthosilicate (tetramethoxysilane or methylsilicate), tetraethyl orthosilicate (tetraethoxysilane or ethylsilicate), tetrapropyl orthosilicate, and tetrabutyl orthosilicate, and partial hydrolysis condensates thereof; and silane coupling agents such as γ-aminopropyltrimethoxysilane, γ-glycidoxypropyltrimethoxysilane, N-($\beta$-aminoethyl)-γ-aminopropyltrimethoxysilane, γ-acryloxypropyltrimethoxysilane, γ-methacryloxypropyltrimethoxysilane, γ-glycidoxypropyltrimethoxysilane, γ-mercaptopropyltrimethoxysilane, and N-($\beta$-aminoethyl)-γ-aminopropylmethyldimethoxysilane, and partial hydrolysis condensates thereof. The hydrolyzable organic silicone compound may comprise only one or a combination of two or more thereof.

Examples of the dehydrating agent include silane coupling agents. Specific examples of the silane coupling agents include silane coupling agents having a functional group such as an amino group, a mercapto group, an epoxy group, a carboxyl group, a vinyl group, an isocyanate group, an isocyanurate group, or halogen. Specific examples of the silane coupling agents having a functional group include isocyanate group-containing silanes such as γ-isocyanatepropyltrimethoxysilane, γ-isocyanatepropyltriethoxysilane, γ-isocyanatepropylmethyldiethoxysilane, and γ-isocyanatepropylmethyldimethoxysilane; amino group-containing silanes such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-ureidopropyltrimethoxysilane, N-phenyl-γ-aminopropyltrimethoxysilane, N-benzyl-γ-aminopropyltrimethoxysilane, and N-vinylbenzyl-γ-aminopropyltriethoxysilane; mercapto group-containing silanes such as γ-mercaptopropyltrimethoxysilane, γ-mercaptopropyltriethoxysilane, γ-mercaptopropylmethyldimethoxysilane, and γ-mercaptopropylmethyldiethoxysilane; epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, and β-(3,4-epoxycyclohexyl)ethyltriethoxysilane; carboxysilanes such as β-carboxyethyltriethoxysilane, β-carboxyethylphenylbis(2-methoxyethoxy)silane, and N-β-(carboxymethyl)aminoethyl-γ-aminopropyltrimethoxysilane; vinyl-type unsaturated group-containing silanes such as vinyltrimethoxysilane, vinyltriethoxysilane, γ-methacryloyloxypropylmethyldimethoxysilane, and γ-acryloyloxypropylmethyltriethoxysilane; halogen-containing silanes such as γ-chloropropyltrimethoxysilane; isocyanurate silanes such as tris(trimethoxysilyl)isocyanurate; and polysulfanes such as bis(3-triethoxysilylpropyl)tetrasulfane.

Examples of the catalyst include known curing catalysts, inclusive of organic tin compounds such as dibutyltin diacetylacetonate, stannous octoate, dibutyltin dioctoate, dibutyltin dilaurate, dibutyltin maleate, dibutyltin diacetate, dibutyltin oxide, dibutyltin bistriethoxysilicate, dibutyltin distearate, dioctyltin dilaurate, dioctyltin diversatate, tin octylate, and tin naphthenate.

The silicone-modified resin composition may contain the plasticizer, the filler, the adhesion-imparting agent, the dehydrating agent, and the catalyst singly or in combination.

The silicone-modified resin composition of the present invention can be suitably used as a sealing material, an adhesive, and the like because it has low modulus properties, high elongation, and high storage stability.

(Silyl-Terminated Polyurethane Resin and Silyl-Terminated Polyurethane Resin Composition)

The silyl-terminated polyurethane resin is a polyurethane resin comprising, as a main component, a silyl-terminated polyurethane obtained by introducing reactive silyl groups into terminals. For example, when a silyl-terminated polyurethane resin composition is used as a sealant, the silyl-terminated polyurethane resin preferably forms siloxane bonds by moisture curing. Examples of the silyl-terminated polyurethane resin include polymers formed by introducing silyl groups into terminal hydroxyl groups of a polyurethane having a linear or branched polyoxyalkylene polymer as a main chain. The silyl-terminated polyurethane resin may be a known resin. Commercially available products of the silyl-terminated polyurethane resin are easily available. Examples of the commercially available products of the silyl-terminated polyurethane resin include GENIOSIL STP-E10, GENIOSIL STP-E15, GENIOSIL STP-E30, and GENIOSIL STP-E35, all manufactured by WACHER Co., Ltd.

The silyl-terminated polyurethane resin composition may contain a plasticizer, a filler, an adhesion-imparting agent, a dehydrating agent, a catalyst, and the like in addition to the silyl-terminated polyurethane resin. The same plasticizer, filler, adhesion-imparting agent, dehydrating agent, and catalyst as those used in the silicone-modified resin composition may be used. The silyl-terminated polyurethane resin composition may contain the plasticizer, the filler, the adhesion-imparting agent, the dehydrating agent, and the catalyst singly or in combination.

The silyl-terminated polyurethane resin composition of the present invention can be suitably used as a sealing material, an adhesive, and the like because it has low modulus properties, high elongation, and high storage stability.

(Method for Producing Silyl-Terminated Resin Composition)

The method for producing a silyl-terminated resin composition of the present invention comprises the steps of: surface-treating calcium carbonate with a fatty acid so that the free fatty acid will be in the range of 1.8 to 2.5% by mass; adding an alkali metal compound to the fatty acid-treated calcium carbonate to produce a surface-treated calcium carbonate; and blending the surface-treated calcium carbonate with a silyl-terminated resin.

In the step of surface-treating calcium carbonate with a fatty acid, calcium carbonate is surface-treated with a fatty acid so that the free fatty acid in the surface-treated calcium carbonate after adding an alkali metal compound will be in the range of 1.8 to 2.5% by mass.

In the step of adding an alkali metal compound, the alkali metal compound is added by adding an aqueous solution of the alkali metal compound to a slurry of the fatty acid-treated calcium carbonate, or by adding an aqueous solution of the alkali metal compound after dehydrating the slurry of the fatty acid-treated calcium carbonate, as described above.

In the step of blending the surface-treated calcium carbonate with a silyl-terminated resin, the surface-treated calcium carbonate obtained as described above is mixed with the silyl-terminated resin. The method of mixing the surface-treated calcium carbonate with the silyl-terminated resin is not particularly limited. For example, the surface-treated calcium carbonate can be mixed with the silyl-terminated resin by stirring them with a stirrer or the like. At this time, a plasticizer, a filler, an adhesion-imparting agent, a dehydrating agent, a catalyst, and the like may be mixed.

According to the production method of the present invention, a silyl-terminated resin composition can be produced which is superior in storage stability before curing and provides a cured product which has a low initial modulus and can maintain the low modulus even after a heat-accelerated test.

EXAMPLES

<Synthesis of Surface-Treated Calcium Carbonate A to K>
(Surface-Treated Calcium Carbonate A)

Water was added to 2000 g of synthetic calcium carbonate having a BET specific surface area of 13 $m^2/g$ so that the solid content would be 10% by mass, and the mixture was stirred at 40° C. to prepare a slurry of calcium carbonate. Next, a mixed fatty acid sodium salt (lauric acid:myristic acid:palmitic acid:stearic acid:oleic acid=3:2:40:15:30 by mass, TANKARU MH manufactured by Miyoshi Oil & Fat Co., Ltd.) and a fatty acid (myristic acid:palmitic acid:stearic acid:oleic acid=2:22:22:35 by mass, No. 0 Fatty Acid manufactured by NOF CORPORATION) were mixed in a predetermined ratio. A 10% by mass aqueous solution of the resulting mixture was prepared and used as a surface treatment agent solution. The surface treatment agent solution was added to the above calcium carbonate slurry to surface-treat calcium carbonate. Note that, based on 100 parts by mass of calcium carbonate, the added amount of the mixed fatty acid sodium salt is 2.7 parts by mass, and the added amount of the fatty acid is 0.3 part by mass.

Next, 300 g of aqueous sodium hydroxide having a concentration of 2.5 mol/l was added to the slurry of the fatty acid-treated calcium carbonate, and the mixture was stirred. Next, the resulting slurry was dehydrated to obtain a cake having a solid content of 60% by mass. The resulting cake was dried with a dryer to obtain surface-treated calcium carbonate A. Note that the added amount of the aqueous sodium hydroxide was adjusted so that the alkali metal content of the surface-treated calcium carbonate after dehydration and drying would be 1600 µg/g. The resulting surface-treated calcium carbonate A was measured for the free fatty acid by the measuring method described above, and the free fatty acid was found to be 1.8% by mass.

(Surface-Treated Calcium Carbonate B)

Surface-treated calcium carbonate B was obtained in the same manner as in the case of surface-treated calcium carbonate A except that, based on 100 parts by mass of calcium carbonate, the added amount of the mixed fatty acid sodium salt was 2.5 parts by mass, and the added amount of the fatty acid was 0.5 part by mass. The resulting surface-treated calcium carbonate B was measured for the free fatty acid by the measuring method described above, and the free fatty acid was found to be 2.0% by mass.

(Surface-Treated Calcium Carbonate C)

Surface-treated calcium carbonate C was obtained in the same manner as in the case of surface-treated calcium carbonate A except that, based on 100 parts by mass of calcium carbonate, the added amount of the mixed fatty acid sodium salt was 3.4 parts by mass, and the added amount of the fatty acid was 0.6 part by mass. The resulting surface-treated calcium carbonate C was measured for the free fatty acid by the measuring method described above, and the free fatty acid was found to be 2.2% by mass.

(Surface-Treated Calcium Carbonate D)

Surface-treated calcium carbonate D was obtained in the same manner as in the case of surface-treated calcium carbonate A except that, based on 100 parts by mass of calcium carbonate, the added amount of the mixed fatty acid sodium salt was 3.2 parts by mass, and the added amount of the fatty acid was 0.8 part by mass. The resulting surface-treated calcium carbonate D was measured for the free fatty acid by the measuring method described above, and the free fatty acid was found to be 2.4% by mass.

(Surface-Treated Calcium Carbonate E)

Surface-treated calcium carbonate E was obtained in the same manner as in the case of surface-treated calcium carbonate C except that the aqueous sodium hydroxide was added so that the alkali metal content of the surface-treated calcium carbonate would be 700 µg/g. The resulting surface-treated calcium carbonate E was measured for the free fatty acid by the measuring method described above, and the free fatty acid was found to be 2.2% by mass.

(Surface-Treated Calcium Carbonate F)

Surface-treated calcium carbonate F was obtained in the same manner as in the case of surface-treated calcium carbonate C except that the aqueous sodium hydroxide was added so that the alkali metal content of the surface-treated calcium carbonate would be 1200 µg/g. The resulting surface-treated calcium carbonate F was measured for the free fatty acid by the measuring method described above, and the free fatty acid was found to be 2.2% by mass.

(Surface-Treated Calcium Carbonate G)

Surface-treated calcium carbonate G was obtained in the same manner as in the case of surface-treated calcium carbonate C except that the aqueous sodium hydroxide was added so that the alkali metal content of the surface-treated calcium carbonate would be 1900 µg/g. The resulting surface-treated calcium carbonate G was measured for the free fatty acid by the measuring method described above, and the free fatty acid was found to be 2.2% by mass.

(Comparative Surface-Treated Calcium Carbonate H)

Surface-treated calcium carbonate H was obtained in the same manner as in the case of surface-treated calcium carbonate A except that, based on 100 parts by mass of calcium carbonate, the added amount of the mixed fatty acid sodium salt was 3.0 parts by mass, and only the mixed fatty acid sodium salt was added. The resulting surface-treated calcium carbonate H was measured for the free fatty acid by the measuring method described above, and the free fatty acid was found to be 1.5% by mass.

(Comparative Surface-Treated Calcium Carbonate I)

Surface-treated calcium carbonate I was obtained in the same manner as in the case of surface-treated calcium carbonate A except that, based on 100 parts by mass of calcium carbonate, the added amount of the mixed fatty acid sodium salt was 2.8 parts by mass, and the added amount of the fatty acid was 1.2 parts by mass. The resulting surface-treated calcium carbonate I was measured for the free fatty acid by the measuring method described above, and the free fatty acid was found to be 2.8% by mass.

(Comparative Surface-Treated Calcium Carbonate J)

Surface-treated calcium carbonate J was obtained in the same manner as in the case of surface-treated calcium carbonate C except that the aqueous sodium hydroxide was not added to the slurry of the fatty acid-treated calcium carbonate. The alkali metal content of the surface-treated calcium carbonate was found to be 250 µg/g. The resulting surface-treated calcium carbonate J was measured for the free fatty acid by the measuring method described above, and the free fatty acid was found to be 2.2% by mass.

(Comparative Surface-Treated Calcium Carbonate K)

Surface-treated calcium carbonate K was obtained in the same manner as in the case of surface-treated calcium carbonate C except that the aqueous sodium hydroxide was added so that the alkali metal content of the surface-treated calcium carbonate would be 2500 µg/g. The resulting surface-treated calcium carbonate K was measured for the free fatty acid by the measuring method described above, and the free fatty acid was found to be 2.2% by mass.

Tables 1 and 2 show the BET specific surface area, the alkali metal content, and the value of free fatty acid of the resulting surface-treated calcium carbonate.

<Synthesis of Surface-Treated Calcium Carbonate L to V>

(Surface-Treated Calcium Carbonate L)

Water was added to 2000 g of synthetic calcium carbonate having a BET specific surface area of 20 m²/g so that the solid content would be 10% by mass, and the mixture was stirred at 40° C. to prepare a slurry of calcium carbonate. Next, a mixed fatty acid sodium salt (lauric acid:myristic acid:palmitic acid:stearic acid:oleic acid=3:2:40:15:30 by mass, TANKARU MH manufactured by Miyoshi Oil & Fat Co., Ltd.) and a fatty acid (myristic acid:palmitic acid:stearic acid:oleic acid=2:22:22:35 by mass, No. 0 Fatty Acid manufactured by NOF CORPORATION) were mixed in a predetermined ratio. A 10% by mass aqueous solution of the resulting mixture was prepared and used as a surface treatment agent solution. The surface treatment agent solution was added to the above calcium carbonate slurry to surface-treat calcium carbonate. Note that, based on 100 parts by mass of calcium carbonate, the added amount of the mixed fatty acid sodium salt is 4.5 parts by mass, and the added amount of the fatty acid is 0.5 part by mass.

Next, 300 g of aqueous sodium hydroxide having a concentration of 2.5 mol/l was added to the slurry of the fatty acid-treated calcium carbonate, and the mixture was stirred. Next, the resulting slurry was dehydrated to obtain a cake having a solid content of 60% by mass. The resulting cake was dried with a dryer to obtain surface-treated calcium carbonate L. Note that the added amount of the aqueous sodium hydroxide was adjusted so that the alkali metal content of the surface-treated calcium carbonate after dehydration and drying would be 1400 µg/g. The resulting surface-treated calcium carbonate L was measured for the free fatty acid by the measuring method described above, and the free fatty acid was found to be 1.9% by mass.

(Surface-Treated Calcium Carbonate M)

Surface-treated calcium carbonate M was obtained in the same manner as in the case of surface-treated calcium carbonate L except that, based on 100 parts by mass of calcium carbonate, the added amount of the mixed fatty acid sodium salt was 4.2 parts by mass, and the added amount of the fatty acid was 0.8 part by mass. The resulting surface-treated calcium carbonate M was measured for the free fatty acid by the measuring method described above, and the free fatty acid was found to be 2.0% by mass.
(Surface-Treated Calcium Carbonate N)

Surface-treated calcium carbonate N was obtained in the same manner as in the case of surface-treated calcium carbonate L except that, based on 100 parts by mass of calcium carbonate, the added amount of the mixed fatty acid sodium salt was 5.5 parts by mass, and the added amount of the fatty acid was 1.0 part by mass. The resulting surface-treated calcium carbonate N was measured for the free fatty acid by the measuring method described above, and the free fatty acid was found to be 2.2% by mass.
(Surface-Treated Calcium Carbonate O)

Surface-treated calcium carbonate O was obtained in the same manner as in the case of surface-treated calcium carbonate L except that, based on 100 parts by mass of calcium carbonate, the added amount of the mixed fatty acid sodium salt was 5.2 parts by mass, and the added amount of the fatty acid was 1.3 parts by mass. The resulting surface-treated calcium carbonate O was measured for the free fatty acid by the measuring method described above, and the free fatty acid was found to be 2.5% by mass.
(Surface-Treated Calcium Carbonate P)

Surface-treated calcium carbonate P was obtained in the same manner as in the case of surface-treated calcium carbonate N except that the aqueous sodium hydroxide was added so that the alkali metal content of the surface-treated calcium carbonate would be 800 µg/g. The resulting surface-treated calcium carbonate P was measured for the free fatty acid by the measuring method described above, and the free fatty acid was found to be 2.2% by mass.
(Surface-Treated Calcium Carbonate Q)

Surface-treated calcium carbonate Q was obtained in the same manner as in the case of surface-treated calcium carbonate N except that the aqueous sodium hydroxide was added so that the alkali metal content of the surface-treated calcium carbonate would be 1600 µg/g. The resulting surface-treated calcium carbonate Q was measured for the free fatty acid by the measuring method described above, and the free fatty acid was found to be 2.2% by mass.
(Surface-Treated Calcium Carbonate R)

Surface-treated calcium carbonate R was obtained in the same manner as in the case of surface-treated calcium carbonate N except that the aqueous sodium hydroxide was added so that the alkali metal content of the surface-treated calcium carbonate would be 1800 µg/g. The resulting surface-treated calcium carbonate R was measured for the free fatty acid by the measuring method described above, and the free fatty acid was found to be 2.2% by mass.
(Comparative Surface-Treated Calcium Carbonate S)

Surface-treated calcium carbonate S was obtained in the same manner as in the case of surface-treated calcium carbonate L except that, based on 100 parts by mass of calcium carbonate, the added amount of the mixed fatty acid sodium salt was 5.0 parts by mass, and only the mixed fatty acid sodium salt was added. The resulting surface-treated calcium carbonate S was measured for the free fatty acid by the measuring method described above, and the free fatty acid was found to be 1.6% by mass.
(Comparative Surface-Treated Calcium Carbonate T)

Surface-treated calcium carbonate T was obtained in the same manner as in the case of surface-treated calcium carbonate L except that, based on 100 parts by mass of calcium carbonate, the added amount of the mixed fatty acid sodium salt was 4.5 parts by mass, and the added amount of the fatty acid was 2.0 parts by mass. The resulting surface-treated calcium carbonate T was measured for the free fatty acid by the measuring method described above, and the free fatty acid was found to be 2.8% by mass.

(Comparative Surface-Treated Calcium Carbonate U)

Surface-treated calcium carbonate U was obtained in the same manner as in the case of surface-treated calcium carbonate N except that the aqueous sodium hydroxide was not added to the slurry of the fatty acid-treated calcium carbonate. The alkali metal content of the surface-treated calcium carbonate was found to be 300 µg/g. The resulting surface-treated calcium carbonate U was measured for the free fatty acid by the measuring method described above, and the free fatty acid was found to be 2.2% by mass.
(Comparative Surface-Treated Calcium Carbonate V)

Surface-treated calcium carbonate V was obtained in the same manner as in the case of surface-treated calcium carbonate N except that the aqueous sodium hydroxide was added so that the alkali metal content of the surface-treated calcium carbonate would be 2300 µg/g. The resulting surface-treated calcium carbonate V was measured for the free fatty acid by the measuring method described above, and the free fatty acid was found to be 2.2% by mass.

Tables 3 and 4 show the BET specific surface area, the alkali metal content, and the value of free fatty acid of the resulting surface-treated calcium carbonate.

Production of Silicone-Modified Resin

Examples 1 to 14 and Comparative Examples 1 to 8

Silicone-modified resin compositions of Examples 1 to 14 and Comparative Examples 1 to 8 were produced using the surface-treated calcium carbonate shown in Tables 1 to 4. Specifically, 120 parts by mass of a surface-treated calcium carbonate, 100 parts by mass of a silicone-modified resin (MS polymer S203 (60 parts by mass) and MS polymer S303 (40 parts by mass), all manufactured by Kaneka Corporation), 55 parts by mass of diisononyl phthalate (DINP), 40 parts by mass of calcium carbonate heavy (Whiton 305 manufactured by Shiraishi Kogyo Kaisha, Ltd.), and 2 parts by mass of a fatty amide (A-S-A T1800 manufactured by Itoh Oil Chemicals Co., Ltd.) were mixed with 2 parts by mass of an aminosilane (SH2000 manufactured by Dow Corning Toray Co., Ltd.), 3 parts by mass of a vinylsilane (KBM1003 manufactured by Shin-Etsu Silicones), and 2 parts by mass of dibutyltin diacetylacetonate (Neostann-U220H manufactured by Nitto Kasei Co., Ltd.) to obtain a paste of a silicone-modified resin composition, which was stored in a cartridge.
[Measurement of Initial 50% Modulus]

The initial 50% modulus of a resin composition was measured as follows. A PP sheet was spread on a glass plate; a glass spacer having a thickness of 3.0 mm was stuck on the sheet; the inside of the space defined by the spacer was filled with the resulting paste so that air bubbles would not enter the paste; and the paste was cured for 14 days at 23° C. and then for 14 days at 30° C. The sheet was punched with a No. 2 dumbbell-shaped die specified in JIS K6251; the test piece was allowed to stand for 1 day or more at 23° C. and then the thickness of the test piece was measured; and the test piece was tested with Autograph at a stress rate of 200 mm/min to measure the initial 50% modulus.
[Measurement of 50% Modulus After Heat-Accelerated Test]

The 50% modulus after heating of a resin composition was measured as follows. The filling, curing, and punching were performed under the same conditions as in the measurement of the initial 50% modulus. Then, the resulting test piece was allowed to stand for 7 days and 14 days, respectively, at 80° C.; the test piece was allowed to stand for 1 day or more at 23° C. and then the thickness of the test piece was measured; and the test piece was tested with Autograph at a stress rate of 200 mm/min to measure the 50% modulus after heat-accelerated test.

[Measurement of Storage Stability]

The storage stability of the resulting paste was measured as follows. The rate of change between initial viscosity and viscosity after storage was used as the index of storage stability. The rate of viscosity change was calculated according to the following formula. The paste was taken from a cartridge, put into a container, and immediately measured for the initial viscosity with a B type viscometer. The cartridge was allowed to stand still for 14 days at 50° C. and then allowed to stand still for 3 hours or more at 20° C., and the paste was then put into a container and measured for the viscosity after storage with a B type viscometer.

Rate of viscosity change (%)=[(viscosity after storage−initial viscosity)/initial viscosity]×100

The rate of viscosity change is shown in Tables 1 to 4 as storage stability.

Tables 1 to 4 show the storage stability, the initial 50% modulus, the 50% modulus after 7 days at 80° C., the 50% modulus after 14 days at 80° C., and the rate of change of the 50% modulus in each Example and Comparative Example. Note that the rate of change of the 50% modulus is a value calculated by the following formula.

Rate of change of 50% modulus (%)=[(50% modulus after 14 days at 80° C.−initial 50% modulus)/initial 50% modulus×100

[Measurement of Water-Resistant Adhesion]

The water-resistant adhesion of a resin composition was measured as follows. Aluminum sheets each having a size of 50×50×5 mm specified in JIS A1439:2004 5.17 were used; a space of 12×12×50 mm was created between the aluminum sheets by combining spacers (No. 1 H-type test specimen); the space was filled with the resulting paste; and the paste was cured under the same conditions as in the measurement of the initial 50% modulus. Then, the resulting test piece was immersed in water and allowed to stand for 7 days and then allowed to stand 1 day or more at 23° C.; the test piece was tested with Autograph at a stress rate of 50 mm/min; the degree of peeling was visually observed; and a test piece showing no peeling (cohesive failure) was rated as good, ○, and a test piece showing peeling (interfacial peeling) was rated as poor, ×.

TABLE 1

| | | Comp. Ex. 1 | Ex. 1 | Ex. 2 | Ex. 3 | Ex. 4 | Comp. Ex. 2 |
|---|---|---|---|---|---|---|---|
| Surface-treated calcium carbonate | Type | H | A | B | C | D | I |
| | BET Specific surface area (m²/g) | 13 | 13 | 13 | 13 | 13 | 13 |
| | Alkali metal content (μg/g) | 1600 | 1600 | 1600 | 1600 | 1600 | 1600 |
| | Free fatty acid (% by mass) | 1.5 | 1.8 | 2.0 | 2.2 | 2.4 | 2.8 |
| Silicone-modified resin composition | Storage stability | 20 | 20 | 25 | 25 | 25 | 40 |
| | 50% modulus (initial) | 0.20 | 0.18 | 0.19 | 0.19 | 0.18 | 0.18 |
| | 50% modulus (7 days at 80° C.) | 0.22 | 0.18 | 0.20 | 0.19 | 0.19 | 0.19 |
| | 50% modulus (14 days at 80° C.) | 0.25 | 0.20 | 0.21 | 0.20 | 0.19 | 0.19 |
| | Rate of change of 50% modulus | 25 | 11 | 11 | 5 | 6 | 6 |
| | Water-resistant adhesion | ○ | ○ | ○ | ○ | ○ | ○ |

It can be seen from Table 1 that, in Examples 1 to 4 in which the free fatty acid is in the range of 1.8 to 2.5% by mass according to the present invention, the storage stability is excellent, and the rate of change of 50% modulus after heat-accelerated test is small, as compared with those in Comparative Examples 1 and 2 in which the free fatty acid is outside the range of the present invention. In Comparative Example 1 in which the free fatty acid is smaller than the range of the present invention, the rate of change of 50% modulus after heat-accelerated test is large. Further, in Comparative Example 2 in which the free fatty acid is larger than the range of the present invention, the storage stability is poor.

TABLE 2

| | | Comp. Ex. 3 | Ex. 5 | Ex. 6 | Ex. 3 | Ex. 7 | Comp. Ex. 4 |
|---|---|---|---|---|---|---|---|
| Surface-treated calcium carbonate | Type | J | E | F | C | G | K |
| | BET Specific surface area (m²/g) | 13 | 13 | 13 | 13 | 13 | 13 |
| | Alkali metal content (μg/g) | 250 | 700 | 1200 | 1600 | 1900 | 2500 |
| | Free fatty acid (% by mass) | 2.2 | 2.2 | 2.2 | 2.2 | 2.2 | 2.2 |
| Silicon-modified resin composition | Storage stability | 45 | 30 | 25 | 25 | 20 | 15 |
| | 50% modulus (initial) | 0.22 | 0.2 | 0.19 | 0.19 | 0.18 | 0.17 |
| | 50% modulus (7 days at 80° C.) | 0.25 | 0.21 | 0.2 | 0.19 | 0.19 | 0.17 |
| | 50% modulus (14 days at 80° C.) | 0.3 | 0.23 | 0.21 | 0.2 | 0.19 | 0.17 |
| | Rate of change of 50% modulus | 36 | 15 | 11 | 5 | 6 | 0 |
| | Water-resistant adhesion | ○ | ○ | ○ | ○ | ○ | × |

It can be seen from Table 2 that, in Examples 3 and 5 to 7 in which an alkali metal content is in the range of 500 μg/g to 2000 μg/g according to the present invention, the storage stability is superior, and the rate of change of 50% modulus after heat-accelerated test is small, as compared with those in Comparative Examples 3 and 4 in which an alkali metal content is outside the range of the present invention. In Comparative Example 3 in which an alkali metal content is lower than the range of the present invention, the storage stability is poor, and the rate of change of 50% modulus after heat-accelerated test is large. Further, in Comparative Example 4 in which an alkali metal content is higher than the range of the present invention, the water-resistant adhesion is poor.

TABLE 3

| | | Comp. Ex. 5 | Ex. 8 | Ex. 9 | Ex. 10 | Ex. 11 | Comp. Ex. 6 |
|---|---|---|---|---|---|---|---|
| Surface-treated calcium carbonate | Type | S | L | M | N | O | T |
| | BET Specific surface area (m²/g) | 20 | 20 | 20 | 20 | 20 | 20 |
| | Alkali metal content (μg/g) | 1400 | 1400 | 1400 | 1400 | 1400 | 1400 |
| | Free fatty acid (% by mass) | 1.6 | 1.9 | 2.0 | 2.2 | 2.5 | 2.8 |
| Silicone-modified resin composition | Storage stability | 20 | 20 | 25 | 25 | 30 | 40 |
| | 50% modulus (initial) | 0.22 | 0.21 | 0.2 | 0.19 | 0.18 | 0.18 |
| | 50% modulus (7 days at 80° C.) | 0.24 | 0.22 | 0.2 | 0.21 | 0.19 | 0.18 |
| | 50% modulus (14 days at 80° C.) | 0.3 | 0.24 | 0.22 | 0.2 | 0.19 | 0.19 |
| | Rate of change of 50% modulus | 36 | 14 | 10 | 5 | 6 | 6 |
| | Water-resistant adhesion | ○ | ○ | ○ | ○ | ○ | ○ |

It can be seen from Table 3 that, in Examples 8 to 11 in which the free fatty acid is in the range of 1.8 to 2.5% by mass according to the present invention, the storage stability is superior, and the rate of change of 50% modulus after heat-accelerated test is small, as compared with those in Comparative Examples 5 and 6 in which the free fatty acid is outside the range of the present invention. In Comparative Example 5 in which the free fatty acid is smaller than the range of the present invention, the rate of change of 50% modulus after heat-accelerated test is large. Further, in Comparative Example 6 in which the free fatty acid is larger than the range of the present invention, the storage stability is poor.

TABLE 4

| | | Comp. Ex. 7 | Ex. 12 | Ex. 10 | Ex. 13 | Ex. 14 | Comp. Ex. 8 |
|---|---|---|---|---|---|---|---|
| Surface-treated calcium carbonate | Type | U | P | N | O | R | V |
| | BET Specific surface area (m²/g) | 20 | 20 | 20 | 20 | 20 | 20 |
| | Alkali metal content (μg/g) | 300 | 800 | 1400 | 1600 | 1800 | 2300 |
| | Free fatty acid (% by mass) | 2.2 | 2.2 | 2.2 | 2.2 | 2.2 | 2.2 |
| Silicone-modified resin composition | Storage stability | 40 | 30 | 25 | 20 | 20 | 15 |
| | 50% modulus (initial) | 0.21 | 0.2 | 0.19 | 0.19 | 0.18 | 0.17 |
| | 50% modulus (7 days at 80° C.) | 0.23 | 0.2 | 0.21 | 0.2 | 0.18 | 0.17 |
| | 50% modulus (14 days at 80° C.) | 0.26 | 0.23 | 0.2 | 0.21 | 0.19 | 0.18 |
| | Rate of change of 50% modulus | 24 | 15 | 5 | 11 | 6 | 6 |
| | Water-resistant adhesion | ○ | ○ | ○ | ○ | ○ | x |

It can be seen from Table 4 that, in Examples 10 and 12 to 14 in which an alkali metal content is in the range of 500 μg/g to 2000 μg/g according to the present invention, the storage stability is superior, and the rate of change of 50% modulus after heat-accelerated test is small, as compared with those in Comparative Examples 7 and 8 in which an alkali metal content is outside the range of the present invention. In Comparative Example 7 in which an alkali metal content is lower than the range of the present invention, the storage stability is poor, and the rate of change of 50% modulus after heat-accelerated test is large. Further, in Comparative Example 8 in which an alkali metal content is higher than the range of the present invention, the water-resistant adhesion is poor.

Although a silicone-modified resin (silyl-terminated polyether resin) was used as a silyl-terminated resin in each Example and each Comparative Example described above, the same effect can be obtained also when other silyl-terminated resins such as a silyl-terminated polyurethane resin are used.

Although the value of the free fatty acid was adjusted by adding a fatty acid to a mixed fatty acid sodium salt in each Example and each Comparative Example described above, the present invention is not limited to this method. Further, although an alkali metal content was adjusted by adding aqueous sodium hydroxide to a slurry of a fatty acid-treated calcium carbonate in each Example and each Comparative Example described above, the present invention is not limited to this method.

The invention claimed is:

1. A silyl-terminated resin composition comprising a surface-treated calcium carbonate and a silyl-terminated resin, wherein the surface-treated calcium carbonate is obtained by surface-treating calcium carbonate having a BET specific surface area in the range of 1 m²/g to 60 m²/g with a fatty acid, and has an alkali metal content in the range of 500 μg/g to 2000 μg/g and the free fatty acid as determined by ethanol extraction is in the range of 1.8 to 2.5% by mass.

2. The silyl-terminated resin composition according to claim 1, wherein the silyl-terminated resin comprises a silyl-terminated polyether resin or a silyl-terminated polyurethane resin as a main component.

3. The silyl-terminated resin composition according to claim 1, wherein the content of the surface-treated calcium carbonate contained in the silyl-terminated resin composition is in the range of 50 parts by mass to 200 parts by mass based on 100 parts by mass of the silyl-terminated resin.

4. The silyl-terminated resin composition according to claim 1, wherein the alkali metal is at least one of sodium and potassium.

5. The silyl-terminated resin composition according to claim 1, wherein the free fatty acid is in the range of 1.8 to 2.2% by mass.

6. The silyl-terminated resin composition according to claim 1, wherein the silyl-terminated resin comprises a silyl-terminated polyurethane resin.

7. A method for producing a silyl-terminated resin composition according to claim 1, comprising the steps of:

surface-treating the calcium carbonate with a fatty acid so that the free fatty acid is in the range of 1.8 to 2.5% by mass;
adding an alkali metal compound to the fatty acid-treated calcium carbonate to produce the surface-treated calcium carbonate; and
blending the surface-treated calcium carbonate with the silyl-terminated resin.

* * * * *